Patented Nov. 15, 1938

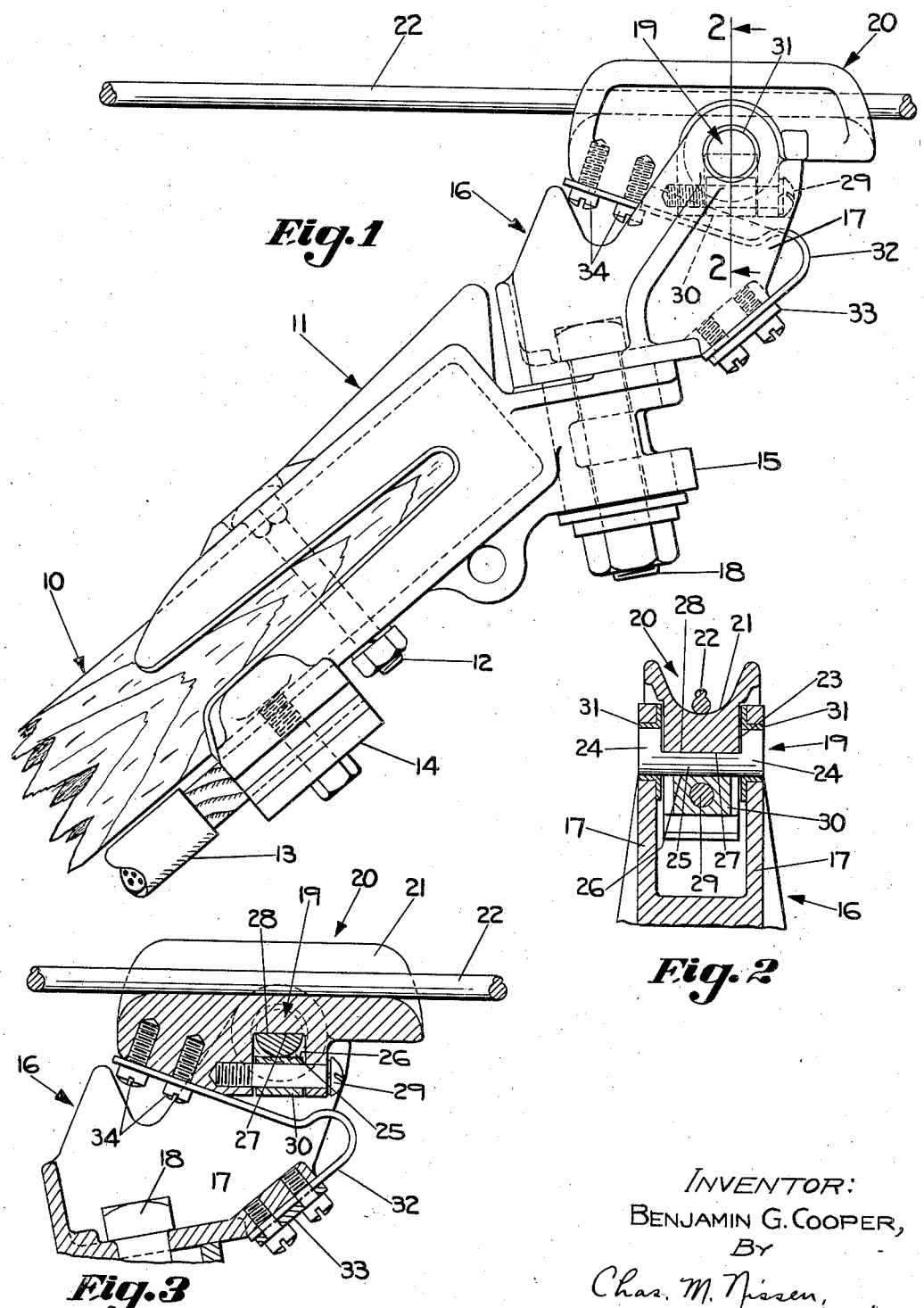

2,136,937

UNITED STATES PATENT OFFICE 2,136,937

TROLLEY GLIDER

Benjamin G. Cooper, Columbus, Ohio, assignor to The Jeffrey Manufacturing Company, a corporation of Ohio Application December 8, 1937, Serial No. 178,773

10 Claims. (Cl. 191—59.1)

This invention relates to a trolley glider or trolley current collector and an object of the invention is to provide a very simple but strong device of this type in which the parts are readily removable but are securely held in place to prevent accidental separation thereof.

Another object of the invention is to provide an improved and simplified trolley current collector or glider involving a minimum of parts in which the trolley shoe may be readily replaced when worn.

Other objects of the invention will appear hereinafter, the novel features and combinations being set forth in the appended claims.

In the accompanying drawing,

Fig. 1 is a side elevational view of the trolley current collector comprising my invention;

Fig. 2 is a sectional view taken on the line 2—2 of Fig. 1 looking in the direction of the arrows; and Fig. 3 is a sectional view running longitudinally through the trolley shoe and harp.

Referring to the accompanying drawing, it may be seen that the trolley current collector or glider comprising my invention is formed by a trolley pole 10, the upper end only of which is illustrated in the drawing, to which is removably attached a socket 11 by a bolt 12 and to which is connected an electric conducting cable 13 by a cable clamp 14. Socket 11 is provided with an integral lug 15 on which is mounted a trolley harp 16 bifurcated to provide spaced apart side plates 17, 17 and swiveled to the lug 15 for pivotal movement about an upright axis by nut and bolt means 18. It is evident that the trolley harp 16 will thus be mounted for pivotal movement about the upright axis of the nut and bolt means 18.

Pivoted in the trolley harp 16 about a horizontal axis formed by a pin 19 is a non-rotary trolley shoe or sliding current collector 20 formed with a longitudinally extending smoothly curved groove 21 presenting an extended contacting area with a trolley wire 22. To effect a simple but very reliable connection between the shoe 20 and the pin 19 and thereby to connect said shoe 20 in a reliable manner with the harp 16 I form said pin 19 with a transversely extending groove 23 which, as clearly seen by reference to Figs. 2 and 3 of the drawing, forms cylindrical end bearing areas 24, 24 connected together by a semi-cylindrical web or connecting member 25. The bottom portion of the body of the shoe 20 is also provided with a transversely extending straight side groove 26. The grooves 23 and 26 cooperate to provide an interlocking relation between the pin 19 and shoe 20 and present to each other cooperating flat bearing surfaces 27 and 28, respectively.

In order to clamp the bearing surfaces 27 and 28 tightly together I provide a removable screw 29 which extends between the spaced side walls of the groove 26 and is threaded into the shoe 20, as clearly illustrated in Fig. 3 of the drawing. To provide an appreciable bearing area against the lower portion of the semi-cylindrical web 25 of pin 19 the screw 29 carries a bearing block 30 which also extends within the groove 26. The end bearing surfaces 24, 24 of the pin 19 are journaled in the side plates 17 of the harp 16 by means of bronze bushings 31, 31.

In order to insure a good electrical connection between the harp 16 and the shoe 20 and to prevent any appreciable amount of current from passing through the pin 19 and the bearing surfaces thereof, I provide a current conducting strap 32 which is rigidly clamped at one end to the harp 16 by clamp means 33 and is rigidly clamped to the trolley shoe 20 at the other end by clamp means 34. The strap 32 is preferably very flexible and is made up of a plurality of thin leaves of soft annealed copper. It is thus to be seen that the shoe 20 is freely pivoted on the trolley harp 16 so that said shoe 20 may pivot about the horizontal axis formed by the pin 19 to present a maximum bearing area of the longitudinally extending groove 21 of said shoe 20 to the trolley wire 22. This pivotal connection between the shoe 20 and the harp 16 is a very simple but reliable one which will allow the removal of the shoe 20 in case it becomes worn to be replaced by another shoe by a minimum of effort. At the same time the simplicity of the parts is such that there is a minimum of possibility of the device becoming inoperative while in use. In this connection it may be mentioned that the screw 29 is preferably provided with a lock washer to lock it in place.

It is furthermore to be noted that even should the screw 29 become loose and lost the shoe would still tend to remain in operative relation for the strap 32 would prevent its rotating more than ninety degrees and due to the cooperating grooves 23 and 26 of the pin 19 and the shoe 20, respectively, said pin 19 would be still held in its operating position in the harp 16.

It is also to be noted that there is not an appreciable load placed upon the screw 29 and thus there is a minimum tendency for it to become loose and lost.

To remove and renew a shoe 20 it is only necessary to remove screws 29 and 34. The removal of screw 29 allows bearing block 30 to drop whereupon shoe 20 can be readily lifted from its interlocking relation with pin 19. Assemblage is effected by a reverse operation.

Obviously those skilled in the art may make various changes in the details and arrangement of parts without departing from the spirit and scope of the invention as defined by the claims hereto appended; and I therefore wish not to be restricted to the precise construction herein disclosed.

Having thus described and shown an embodiment of my invention, what I desire to secure by Letters Patent of the United States is:

1. In a trolley current collector, the combination with a trolley harp having spaced walls with bearing surfaces, a one-piece collector shoe positioned between the spaced walls of said harp; said shoe having a transversely extending groove therein, a supporting pin extending through said shoe groove and having ends journaled in said bearing surfaces and having a transversely extending groove into which said shoe extends, and means cooperating with the grooved structure of said pin and shoe to maintain said shoe attached to said pin.

2. In a trolley current collector, the combination with a trolley pole, of a trolley socket mounted on the upper end thereof, a trolley harp carried by said socket, a non-rotary one-piece collector shoe, a pin pivotally mounting said shoe on said harp for movement on a horizontal axis, an electrical cable connected to said socket, means including said harp for effecting an electrical connection between said shoe and said socket, and means including cooperating grooves on said shoe and pin for removably attaching them together.

3. In a current collector, the combination with a trolley harp, of a sliding collector shoe, a pin pivotally connecting said shoe and harp, said pin and shoe having cooperating interlocking means, formed by cooperating grooves, and a screw extending across the shoe groove and holding said pin therein.

4. In a current collector, the combination with a trolley harp having spaced side walls, of a pin having spaced cylindrical bearing areas journaled in said side walls and being grooved to form a connecting web between said cylindrical bearing areas, a trolley shoe having a transversely extending groove adapted to receive said web with the cylindrical bearing portions of said pin on opposite sides of said shoe, and means for removably maintaining said web in said shoe groove.

5. In a current collector, the combination with a trolley harp, of a sliding collector shoe, a pin pivotally connecting said shoe and harp, said pin and shoe having cooperating interlocking means formed by cooperating grooves, and means for removably maintaining said interlocking relation.

6. A current collector comprising a one-piece shoe, a harp, a pin pivotally connecting said shoe and harp, said pin and shoe having grooves disposed at right angles to each other formed to provide an interlock between said shoe and said pin, and means to maintain said interlocking relation.

7. A current collector comprising a one-piece shoe, a harp, a pin pivotally connecting said shoe and harp, said pin and shoe having grooves disposed at right angles to each other formed to provide an interlock between said shoe and said pin, and means to maintain said interlocking relation, said means including a bearing block positioned in the shoe groove and clamping the pin in said shoe groove, and means for removably holding said bearing block in place.

8. In a trolley current collector, the combination with a harp having spaced side walls, of a shoe, a pin pivotally connecting said shoe and harp, and, having journal areas at each end journaled in said side walls and being grooved intermediate its ends to provide a flat top bearing surface, a transverse groove in the bottom of said shoe providing a flat bottom bearing surface on said shoe, said pin and shoe slots providing for the interlocking of said pin and shoe with said flat top and bottom bearing surfaces in contacting relation, and means extending below said pin and between the side walls of said shoe groove for maintaining said interlocking relation.

9. In a trolley current collector, the combination with a harp having spaced side walls, of a shoe, a pin pivotally connecting said shoe and harp and having journal areas at each end journaled in said side walls and being grooved intermediate its ends to provide a flat top bearing surface, a transverse groove in the bottom of said shoe providing a flat bottom bearing surface on said shoe, said pin and shoe slots providing for the interlocking of said pin and shoe with said flat top and bottom bearing surfaces in contacting relation, and means extending below said pin and between the side walls of said shoe groove for maintaining said interlocking relation, said means including a screw threaded into said shoe and extending through a bearing block in said shoe groove which block is in contacting relation with said pin.

10. In a trolley current collector, the combination with a harp having spaced side walls, of a shoe, a pin pivotally connecting said shoe and harp and having journal areas at each end journaled in said side walls and being grooved intermediate its ends to provide a flat top bearing surface, a transverse groove in the bottom of said shoe providing a flat bottom bearing surface on said shoe, said pin and shoe slots providing for the interlocking of said pin and shoe with said flat top and bottom bearing surfaces in contacting relation, and means extending below said pin and between the side walls of said shoe groove for maintaining said interlocking relation, said means including a screw threaded into said shoe.

BENJAMIN G. COOPER.